(12) United States Patent
Wolcott et al.

(10) Patent No.: US 9,479,515 B2
(45) Date of Patent: *Oct. 25, 2016

(54) IDENTIFICATION OF A FAULT (71) Applicant: Comcast Cable Communications, LLC, Philadelphia, PA (US)

(72) Inventors: Lawrence D. Wolcott, Denver, CO (US); Philip F. Chang, Langhorne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/782,573

(22) Filed: Mar. 1, 2013

(65) Prior Publication Data

US 2013/0176860 A1    Jul. 11, 2013

Related U.S. Application Data (63) Continuation of application No. 12/848,335, filed on Aug. 2, 2010, now Pat. No. 8,416,697.

(60) Provisional application No. 61/301,835, filed on Feb. 5, 2010.

(51) Int. Cl.
*H04L 25/03* (2006.01)
*H04L 29/06* (2006.01)
*H04L 12/26* (2006.01)
(Continued)

(52) U.S. Cl.
CPC ............ *H04L 63/107* (2013.01); *H04L 25/03* (2013.01); *H04L 25/03019* (2013.01); *H04L 43/0823* (2013.01); *H04L 67/18* (2013.01); *H04L 25/022* (2013.01); *H04L 2025/0342* (2013.01); *H04L 2025/03808* (2013.01)

(58) Field of Classification Search
CPC ............ H04L 2025/03808; H04L 25/03019; H04L 43/0823; H04B 1/707; H04N 7/17309
See application file for complete search history.

(56) References Cited

U.S. PATENT DOCUMENTS

| 5,311,546 | A | 5/1994 | Paik et al. |
| 5,881,108 | A | 3/1999 | Herzberg et al. |
| 6,377,810 | B1 | 4/2002 | Geiger et al. |

(Continued)

FOREIGN PATENT DOCUMENTS

JP          04208707 A    *    7/1992    ............. H03H 21/00

OTHER PUBLICATIONS

DOCSIS® Best Practices and Guidelines Proactive Network Maintenance Using Preequalization CM-GL-PNMP-V01-100415; Apr. 15, 2010.

(Continued)

*Primary Examiner* — Xavier S Wong
(74) *Attorney, Agent, or Firm* — Banner & Witcoff, Ltd.

(57) ABSTRACT

An apparatus, method, and system are provided for determining a location of an error source. Equalization coefficients may be retrieved and an average period of time between localized peak amplitudes may be determined. The average period of time may be multiplied by a velocity of propagation associated with a communication channel to determine an approximate location of the error source. The equalization coefficients may correspond to the inverse of the frequency response associated with the communication channel and may be updated over time using replacement or combination (e.g., convolution) techniques.

18 Claims, 7 Drawing Sheets

(51) Int. Cl.
*H04L 29/08* (2006.01)
*H04L 25/02* (2006.01)

(56) References Cited

U.S. PATENT DOCUMENTS

| | | | |
|---|---|---|---|
| 6,434,193 B1* | 8/2002 | Fukuoka | H03H 21/0012 375/229 |
| 6,556,239 B1 | 4/2003 | Al-Araji et al. | |
| 6,671,334 B1 | 12/2003 | Kuntz et al. | |
| 6,728,887 B1 | 4/2004 | Dziekan et al. | |
| 6,862,315 B1 | 3/2005 | Garg et al. | |
| 6,880,170 B1 | 4/2005 | Kauffman et al. | |
| 6,947,502 B2 | 9/2005 | Taylor et al. | |
| 6,947,741 B2 | 9/2005 | Beech et al. | |
| 7,142,609 B2 | 11/2006 | Terreault et al. | |
| 7,574,492 B2 | 8/2009 | Karaoguz et al. | |
| 7,742,777 B2 | 6/2010 | Strater et al. | |
| 7,843,847 B2 | 11/2010 | Quigley et al. | |
| 8,143,900 B2 | 3/2012 | Shimp et al. | |
| 8,284,828 B2 | 10/2012 | Cooper et al. | |
| 8,416,697 B2* | 4/2013 | Wolcott et al. | 370/241 |
| 8,458,759 B2 | 6/2013 | Zinevich | |
| 8,576,705 B2 | 11/2013 | Thibeault et al. | |
| 8,650,602 B2 | 2/2014 | Pond et al. | |
| 8,787,223 B2 | 7/2014 | Watson et al. | |
| 8,829,916 B2 | 9/2014 | Defoort et al. | |
| 2001/0017904 A1 | 8/2001 | Pukkila et al. | |
| 2003/0058786 A1 | 3/2003 | Sato et al. | |
| 2003/0109999 A1 | 6/2003 | Stein et al. | |
| 2003/0191856 A1 | 10/2003 | Lewis et al. | |
| 2003/0217122 A1 | 11/2003 | Roese et al. | |
| 2004/0100881 A1 | 5/2004 | Wakabayashi et al. | |
| 2004/0145470 A1* | 7/2004 | Fager et al. | 340/539.13 |
| 2004/0153898 A1 | 8/2004 | Hidaka | |
| 2004/0222908 A1 | 11/2004 | MacDonald et al. | |
| 2005/0207346 A1 | 9/2005 | Chu et al. | |
| 2005/0226421 A1 | 10/2005 | Briancon et al. | |
| 2006/0007997 A1* | 1/2006 | Jones | 375/231 |
| 2006/0121946 A1 | 6/2006 | Walton et al. | |
| 2006/0271986 A1 | 11/2006 | Vogel | |
| 2007/0109995 A1 | 5/2007 | Quigley et al. | |
| 2007/0211618 A1* | 9/2007 | Cooper et al. | 370/208 |
| 2007/0288982 A1 | 12/2007 | Donahue | |
| 2008/0080607 A1 | 4/2008 | Shah | |
| 2008/0089224 A1* | 4/2008 | Kim et al. | 370/210 |
| 2008/0129421 A1 | 6/2008 | Ninan et al. | |
| 2008/0192816 A1* | 8/2008 | Momtaz | H04L 25/03057 375/233 |
| 2008/0276111 A1 | 11/2008 | Jacoby et al. | |
| 2009/0007210 A1 | 1/2009 | Nishide et al. | |
| 2009/0268799 A1* | 10/2009 | Wang et al. | H04L 25/03057 375/232 |
| 2009/0304065 A1* | 12/2009 | Choi | H04N 21/23611 375/232 |
| 2010/0095360 A1 | 4/2010 | Pavlovski et al. | |
| 2010/0142608 A1* | 6/2010 | Kim et al. | 375/232 |
| 2010/0158093 A1 | 6/2010 | Thompson et al. | |
| 2010/0183258 A1 | 7/2010 | Chow et al. | |
| 2010/0185865 A1 | 7/2010 | Yeap et al. | |
| 2010/0223650 A1* | 9/2010 | Millet et al. | 725/111 |
| 2011/0026577 A1* | 2/2011 | Primo et al. | 375/232 |
| 2011/0110415 A1* | 5/2011 | Cooper et al. | 375/232 |
| 2015/0318937 A1 | 11/2015 | Ruth et al. | |

OTHER PUBLICATIONS

Document titled "VSWR, or Voltage Standing Wave Ratio"; prior to Nov. 1, 2010.
Cablelabs invention disclosure titled "Pre-Equalization based proactive network maintenance process model"; prior to Nov. 1, 3010.
Hranac, R., "Linear Distortions part 1 ," downloaded Apr. 22, 2010.
Qureshi, S.U.H., "Adaptive Equalization," Proceedings of the IEEE, Sep. 1985.
Cablelabs invention disclosure titled "A Simple algorithm for fault localization using naming convention and micro-reflection signature"; prior to Nov. 1, 2010.
Thompson, R. et al., "Optimizing Upstream Throughput Using Equalization Coefficient Analysis"; prior to Nov. 1, 2010.
"VSWR, or Voltage Standing Wave Ratio", available at http://emc.toprudder.com/vswr.pdf (last visited Nov. 22, 2010).
Melissa Ray Weimer, "Waveform Analysis Using the Fourier Transform", DATAQ Instruments, Inc., available at http://www.dataq.com/applicat/articles/an11.htm (last visited Nov. 22, 2010).
Rob Thompson et al., "Optimizing Upstream Throughput Using Equalization Coefficient Analysis", Motorola Home & Networks Mobility, 2009.
Robert L. Howald et al., "Characterizing and Aligning the HFC Return Path for Successful DOCSIS 3.0 Rollouts", SCTE Cable-Tec Expo, Denver, CO, Oct. 28-30, 2009.
Robert L. Howald et al., "Docsis 3.0 Upstream: Readiness & Qualification", 2009.
U.S. Appl. No. 12/917,001, filed Nov. 1, 2010, Determining Response Signature Commonalities.
U.S. Appl. No. 12/848,262, filed Aug. 2, 2010, Modulation Analysis and Distortion Identification.
U.S. Appl. No. 12/848,335, filed Aug. 2, 2010, Identification of a Fault.
U.S. Appl. No. 13/155,464, filed Jun. 8, 2011, Inducing Response Signatures in a Communication Network.

* cited by examiner

IDENTIFICATION OF A FAULT

RELATED APPLICATIONS

The present application is a continuation of U.S. patent application Ser. No. 12/848,335, filed Aug. 2, 2010, titled "Identification of a Fault," which claims the priority benefit of U.S. Provisional Patent Application No. 61/301,835, filed Feb. 5, 2010, entitled "Modem Signal Usage and Fault Isolation." Each of the above applications is incorporated by reference herein.

FIELD OF ART

The features described herein generally relate to providing users with access to content over a network. More specifically, aspects of the disclosure describe identifying a likely or approximate location of a potential problem or error associated with a network.

BACKGROUND

From the perspective of a service provider or network operator, the most common driver for user initiated contact related to service problems is typically caused by in-home wiring issues. For example, standard metrics used to evaluate user terminal (e.g., modem) performance are subject to equalization and may provide a misleading or incomplete picture of signal performance. Standard metrics generally provide a good representation of the user's overall experience, but the equalization can mask signal impairments which may manifest intermittently and not necessarily at the time of analysis.

Furthermore, intermittent issues are often hidden by equalization employed by user terminals. Intermittent transmission problems often result in inconclusive troubleshooting and a poor user experience. This often leads to a user repeatedly contacting the network operator to complain about issues such as failures and difficulties on the part of a technician in recreating an error condition. When debugging a fault, traditional performance metrics are generalized and fail to provide an indication as to where the source of the fault is located.

Improved techniques are needed to minimize operational down-time, shorten service time, and enhance a user's experience.

SUMMARY

This summary is not intended to identify critical or essential features of the disclosure provided herein, but instead merely summarizes certain features and variations thereof.

In some embodiments, distortion compensation (pre-equalization) may be performed at a user terminal prior to transmission of a signal from the user terminal. In some embodiments, distortion compensation (post-equalization) may be performed after the signal has been transmitted from the user terminal and received at a receiving device. The distortion compensation techniques may be used to correct for deficiencies or non-idealities in a network (e.g., the components or communication channel(s) thereof). For example, the distortion techniques may be used to minimize or eliminate demodulation errors at the receiving device, thereby promoting accuracy in terms of symbol recognition/detection.

In some embodiments, adaptive (or dynamic) equalization coefficients may be gathered from one or more devices (e.g., a user terminal, a modem, a termination system such as a cable modem termination system (CMTS), etc.). The equalization coefficients may include both time and frequency related information. Analysis of the equalization coefficients in terms of magnitudes and/or location relative to a reference or main-tap may provide a ratio that can be used to discriminate impairments that are typically near the user terminal versus those which are beyond a user's location (e.g., a user's home). For example, given a data symbol period, the source of an error located a distance from the user's terminal may be approximated using velocity of propagation mathematics. The distance may correspond to a measurement between two impedance mismatches (reflectors) which have formed a signal cavity, causing a recursive echo. In most cases of large reflections on a plant, one of the reflectors is co-located within a user's premises. That said, the distance is not actually from the user's terminal (e.g., a modem), rather the user's premises (e.g., the user's home).

The equalization coefficients may be indicative of samples of a signal taken at discrete periods of time. Each sample may coincide with a tap of a tap-delay filter. For example, the main-tap may coincide with a signal from a user terminal at a discrete instant in time and the other taps may represent prior or future samples of the signal relative to the main-tap. In some embodiments, one or more processors associated with one or more devices may execute instructions stored in a memory to implement the tap-delay filter, to establish equalization coefficients, and to analyze the equalization coefficients.

Other details and features will also be described in the sections that follow.

BRIEF DESCRIPTION OF THE DRAWINGS

Features will become apparent upon a review of this disclosure in its entirety, including the drawing figures provided herewith, the contents of which are fully incorporated herein by way of reference.

Some features herein are illustrated by way of example, and not by way of limitation, in the figures of the accompanying drawings and in which like reference numerals refer to similar elements.

DETAILED DESCRIPTION

It is noted that various connections between elements are discussed in the following description. It is noted that these connections are general and, unless specified otherwise, may be, for example, wired or wireless, direct or indirect, and that this specification is not intended to be limiting in this respect.

Figure 1:
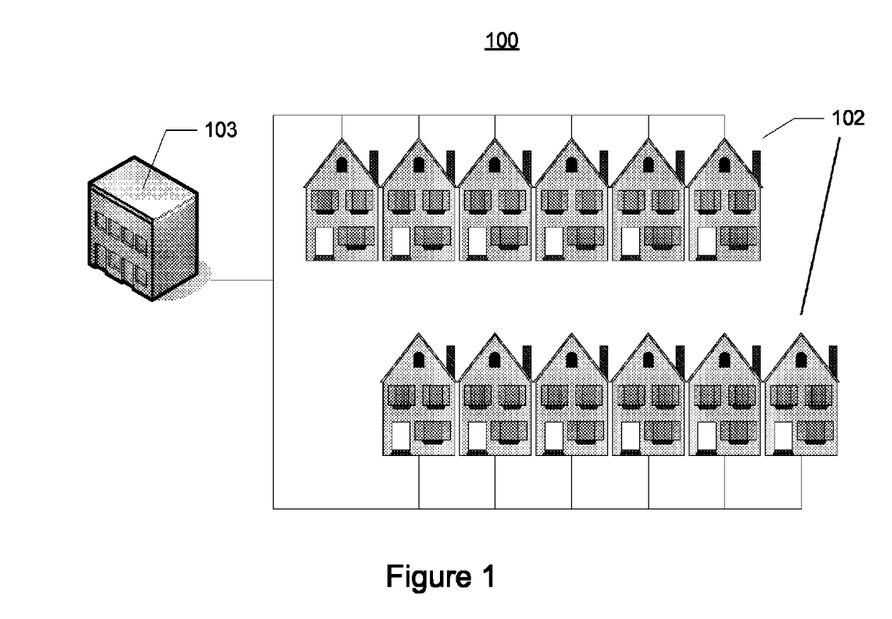
FIG. 1 illustrates an example information distribution system.

FIG. 1 illustrates an example information distribution network 100 on which many of the various features described herein may be implemented. Network 100 may be any type of information or content distribution network, such as satellite, optical fiber, coaxial cable, telephone, cellular, wireless, etc. The network may be a hybrid fiber/coax distribution network found in many television networks. Such networks 100 may use a series of interconnected lines 101 to connect multiple homes 102 to a provider's headend or central location 103. The central location 103 may transmit downstream information signals onto the lines 101, and each home 102 may have a tuner used to receive and process those signals. Signals may also include upstream transmissions from homes 102 to central location 103.

The lines 101 may be a series of interconnected lines of different type, such as optical fiber and/or coaxial cables. There may be one line originating from the central location 103, and it may be split a number of times to distribute the signal to various remote sites such as homes 102 in the vicinity (which may be many miles) of the central location 103. The lines 101 may include components not illustrated, such as splitters, filters, amplifiers, etc. to help convey the signal clearly. Portions of the lines 101 may also be implemented with fiber-optic cable, resulting in a hybrid fiber/cable (HFC) network of lines 101. By running fiber optic cable along those portions, signal degradation in those portions may be significantly minimized, allowing a single central location 103 to reach even farther with its network of lines 101 than before. Portions of lines 101 may also be implemented via wireless links.

Figure 2:
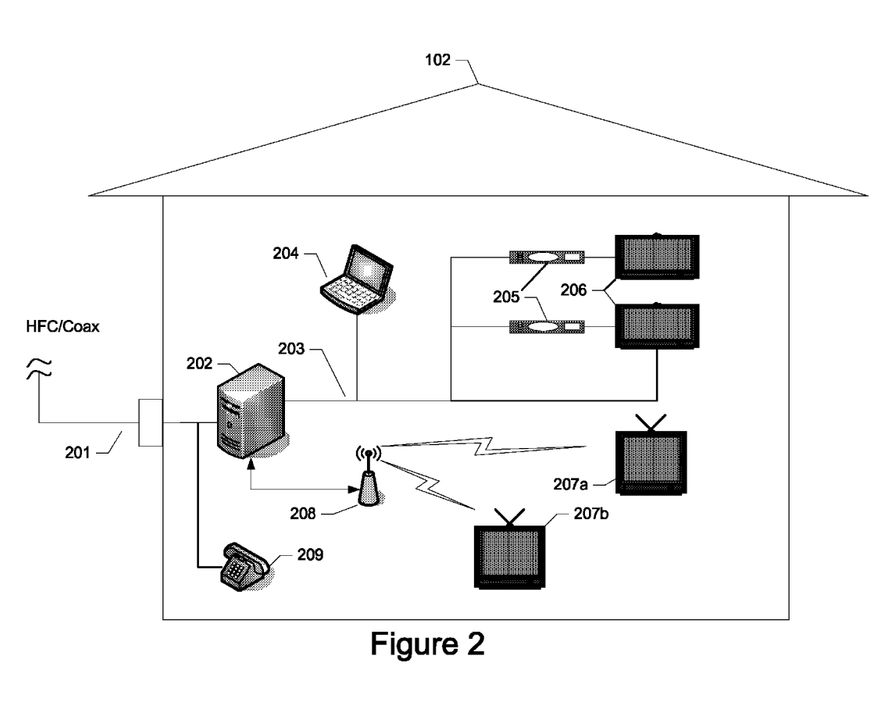
FIG. 2 illustrates an example architecture, with a closer level of detail on one of the premises illustrated in the FIG. 1 network.

FIG. 2 illustrates a closer view of one of the remote sites, home 102 from FIG. 1. As illustrated, the home 102 may be connected to the network 100 by, for example, a wireless link, optical fiber or coaxial cable feed 201. The feed may be connected to a gateway device 202, which may serve as an interface between the devices within the home 102, and the external devices out on the network 100. The gateway itself may include tuners, modulators, demodulators, etc. to communicate out on the network 100, and may also include interface components to communicate with the devices in the home.

As for the network in the home, the specific types of components may vary, depending on the type of communication network used in the home. One example may be an Internet Protocol network 203 carried over the home's internal coaxial wiring under the MoCA (Multimedia Over Coax Alliance) standard. To this end, the gateway 202 may be an IP transport gateway, using IP communications to communicate with the devices in the home, and with devices outside the home (e.g., via a DOCSIS CMTS in a HFC-type network, for example). Other networks, such as wireless networks, may alternatively be used.

Various devices may communicate on the network in the home. For example, one or more personal computers 204 may use the gateway 202 to communicate with other devices on the provider's network, such as a private or public network (e.g., the Internet). Customer premises equipment (CPE) 205, such as set-top boxes (STBs), may receive IP distribution of video content received at the gateway 202, and convert that video content into a format suitable for display on corresponding display devices 206, such as televisions, monitors, handheld devices, etc. Alternatively, display devices 206 may incorporate functionality of premises equipment 205. For example, the CPE 205 may receive an MPEG2 stream of video, and may process that stream to generate an HDMI (High Definition Multimedia Interface) output signal to each CPE 205 or corresponding display device 206. While STBs are described below, one skilled in the art would appreciate that devices in addition to, or in lieu of STBs, such as personal computers (PCs), servers, gateways, etc., may be used in some embodiments.

Some display devices in the home, however, might not have their own CPE, such as a STB. Or they might not have the circuitry needed to decode the MPEG2 stream of video received at the gateway 202. For example, display devices such as televisions 207a and 207b might be old-fashioned analog televisions, having tuners configured to tune to the analog broadcast channels defined by the NTSC (National Television System Committee). Or, they may be digital televisions not equipped to receive and decode the latest form of digital compression or modulation used on the network 100. To support such legacy devices, the gateway 202 may include a local wireless transmitter 208.

The local wireless transmitter 208 may be configured to transmit a low-power radio frequency channel carrying video signals of a selected program for local reception within the home. For example, if the television 207a is an analog television, the gateway 202 may use the transmitter 208 to transmit a selected program as an NTSC video signal on an NTSC Channel (e.g., channel 2). That channel and signal can be tuned by the television 207a, and displayed for the user's consumption. In this manner, legacy devices may continue to be used even if transmission techniques advance. The transmitter 208 may use any desired wireless format, such as IEEE 802.11, ZIGBEE, BLUETOOTH, etc. An 802.11 transmitter 208 may be especially useful, since the 2.4 GHz range of that standard happens to overlap the 300 MHz-3 GHz frequency range of the NTSC UHF channels.

Any number and type of devices (e.g., computers, mobile devices, cable modems, telephones, set top boxes, etc.) may be located within the network of FIGS. 1 and 2. Those devices located at a user's premises, such as home 102, may generally be referred to as user terminals.

By way of introduction, equalization may be performed to account for non-idealities in the frequency response associated with transmissions from a user terminal to another device (e.g., a termination system (TS)) by way of a communication channel. The frequency response may be used to demonstrate a difference between what is transmitted by the user terminal and what is received by the device. This difference may be caused by and may sometimes be referred to as distortion. Equalizers may be used to perform the equalization and may be configured to dynamically (e.g., adaptively) correct for the difference. In some embodiments, the equalizer may be implemented using one or more (digital signal) processors in conjunction with one or more algorithms embodied as instructions stored in a memory. The equalization may correspond to the inverse of the frequency response associated with the network, (e.g., the communication channel and the components making up the network), such that when a signal is received from the user terminal at the device, the signal appears undistorted to the device.

Figure 3:
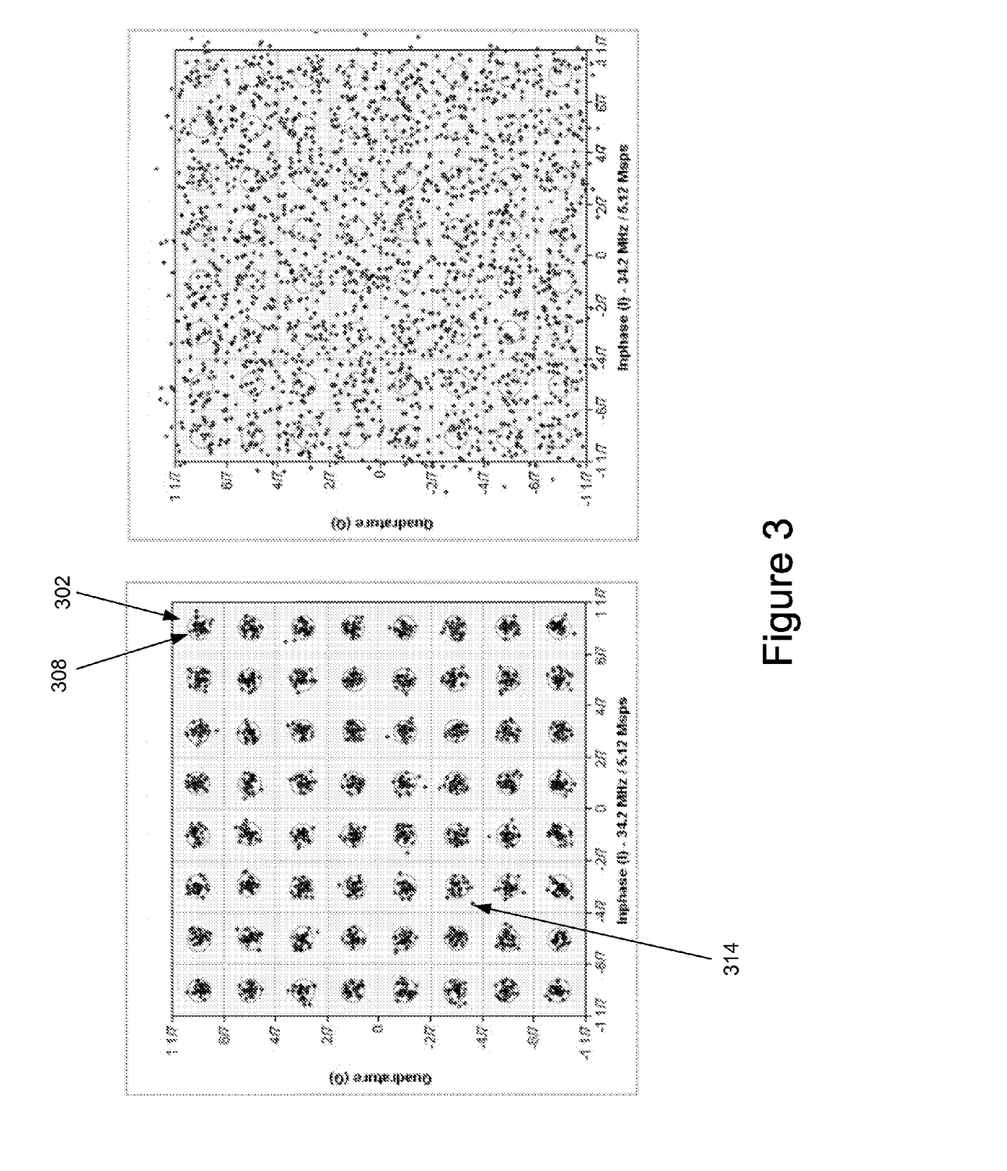
FIG. 3 illustrates a constellation pattern associated with a modulation technique described herein.

In conducting equalization, errors such as symbol errors following demodulation at a receiver may be eliminated or reduced. For example, a context involving a grid mapping of 64-quadrature amplitude modulation (64-QAM) is shown in FIG. 3. Each symbol of the 64-QAM grid may be represented by a box, one of which is shown as box 302 in FIG. 3. Box 302 may define a decision region, where a received symbol may be decoded as a corresponding given symbol when it is located inside box 302.

In an ideal operating environment, every received symbol may be located at the exact center of each box. Due to non-ideal effects, however, a scatter in the received symbols may result in actual implementations. Circle 308 may represent a scatter of symbols with respect to box 302, where the radius of circle 308 may represent where the vast majority of the symbols corresponding to box 302 are decoded. The radius of circle 308 may also represent a tolerance (such as a quality of service (QoS) parameter) that a network operator or service provider needs to satisfy. For example, the distance from circle 308 to box 302 may represent a noise margin in some embodiments.

Dot 314 may represent an instance where a symbol is received that falls outside of a circle. As the location of dot 314 moves further from the center of a box (and closer to the perimeter of that box), a greater likelihood may exist that the symbol will not be received properly (e.g., that the received symbol will be decoded incorrectly at a receiver).

Equalization may have a tendency to more closely focus the distribution of the received symbols towards the center of each of the sixty-four boxes making up the grid, thereby improving the relative noise margins with respect to each of the decision boundaries. The grid on the left of FIG. 3 shows a scatter of data that is well within the decision boundaries (e.g., the perimeters of each box), whereas the grid on the right of FIG. 3 shows the scatter of data approaching and intersecting the perimeters of each box, and thus, likely leading to symbol demodulation errors. While QAM modulation is shown in FIG. 3, in some embodiments different transmission or modulation techniques may be used. For example, amplitude modulation (AM), frequency modulation (FM), and the like may be used.

One type of analysis of network performance may be based on a post-equalization perspective. This type of analysis may provide insight into a user's experience, but such an analysis may hide intermittent or latent problems by obscuring plant issues until a problem becomes visible from the user's perspective. Higher quality service may be provided to a user by diagnosing problems/issues in advance of when they actually manifest themselves at the user's location.

In general, equalizer coefficients may be complex numbers (e.g., have real and imaginary components) and may include time and frequency information. The equalizer coefficients may be represented in a bar graph format, similar to the bar graph shown in FIG. 4. In the bar graph of FIG. 4, twenty-four (24) coefficients are shown. The twenty-four coefficients may represent time-delayed samples (by way of a tap-delay filter) of a signal transmitted from a user terminal to another device (e.g., a TS). In some embodiments, a different number of coefficients (and a corresponding different order tap-delay filter) may be used.

A reference or main-tap may be designated to correspond to a particular time period of analysis. For example, in an example system employing DOCSIS 2.0, the main-tap is in the eighth position. Under DOCSIS 1.1, the main-tap is in the fourth position. Different tap positions may be designated as the main-tap in some embodiments. For purposes of illustration, assuming that the main-tap corresponds to the eighth position in FIG. 4, those taps to the right of the main-tap (e.g., tap positions 9-24 in FIG. 4) may represent past samples relative to the time associated with the main-tap, and those taps to the left of the main-tap (e.g., tap positions 1-7 in FIG. 4) may represent future samples relative to the time associated with the main-tap.

The equalizer coefficients may indicate how hard the user terminal is working to redistribute energy across the span of equalization based on the error or distortion source. In an ideal network operating environment, all the energy of the transmitted signal would be concentrated in the main-tap. However, due to distortion sources or non-idealities typically present in actual operating environments, energy is located in taps other than the main-tap.

The types of distortion that may be present may include linear and non-linear distortions. Linear distortions may be those distortions that impact the amplitude and/or phase of an original signal. Micro-reflections (which, as seen by a receiver, may be a copy of a transmitted signal arriving late and with a reduced amplitude), amplitude distortion (which may represent undesirable variation in a communication channel's amplitude response and may result in distortion of a signal's amplitude), and group delay variation (which may represent undesirable variation in a communication channel's phase response and may result in distortion of a signal's phase or a variation in the propagation of frequency components of the signal across the channel) are examples of linear distortions. Non-linear distortions may be those distortions that generate distortion components, including harmonics of the original signal or multiples of the original signal with other energy present in a return band. The equalizer coefficients may provide insight into the actual operating environmental conditions.

A user terminal may engage in a series of communications with another device (e.g., a TS) for purposes of establishing the values of the equalization coefficients. For example, the user terminal may transmit a request message to the device, and the request message may include a preamble or other predefined data fields. The device (e.g., a TS such as a CMTS) may analyze the data fields to determine the quality of the received signal as well as to determine the adjustment the user terminal should make to its equalization coefficients to compensate for distortion. The device may send a response message with equalization coefficients to be used by the user terminal. In some embodiments, the response message may include a parameter or flag that directs the user terminal on how to interpret the equalization coefficients included in the response message. For example, the parameter may instruct the user terminal to replace the equalization coefficients presently used by the user terminal with the equalization coefficients included in the response message. Alternatively, the parameter may instruct the user terminal to combine (e.g., via a weighted summation, convolution, or the like) the equalization coefficients presently used by the user terminal with the equalization coefficients included in the response message.

While discussed above as a single request-response message set, in some embodiments a plurality of request-response messages may be exchanged between the user terminal and the device (e.g., a TS) before a final set of equalization coefficients is established for use by the user terminal. An exchange of multiple messages may have a tendency to average any dynamic characteristics associated with the communication channel's frequency response, thereby allowing the final set of equalization coefficients to approximate or settle on the typical channel frequency response.

In terms of updating the equalization coefficients used by the user terminal, any number of techniques may be implemented as a function of the network's desired operation. For example, the request/response message sequence described above may be periodically repeated (e.g., every thirty seconds, every minute, etc.). Alternatively, the user terminal and the device may be arranged as a master-slave configuration, with one of the user terminal and the device initiating an equalization coefficient update. In some embodiments, the request-response messages (or more specifically, the functionality associated with the request-response messages in regards to establishing and updating the equalization coefficients) may be incorporated in messages that are used for payload or data exchange between the user terminal and the device.

In terms of scheduling an update of the equalization coefficients, if a user terminal or a communication channel has demonstrated issues or problems, the frequency of monitoring or updating the equalization coefficients may be increased relative to those terminals or communication channels that have not experienced any (or have experienced less) issues or problems. Also, if a particular terminal is deemed to be of particular importance (e.g., a terminal that is responsible for communicating data related to the transportation of toxic chemicals), that terminal may be given priority in terms of monitoring and updating relative to other, less important terminals.

In some embodiments, (post-)equalization may also be performed at the receiving device (e.g., the TS). In an HFC network, for example, given that the CMTS frequently communicates with a plurality of user terminals (e.g., cable modems), and that each user terminal typically has its own associated frequency response with respect to the CMTS, a decision may be made to perform equalization at the user terminals (pre-equalization) in order to minimize the processing load on the CMTS. Since post-equalization operations start off every new data burst from scratch, there is no memory condition to become corrupted from any given error condition. Also, in low frequency operating environments (e.g., less than 20 MHz) where ingress and impulse noise are common, post-equalization may provide more stable performance. Post-equalization may also enable the user terminals to use lower transmit levels as there is no requirement of a pre-equalization function being convolved at the user terminal for post-equalization to work.

The equalization coefficients (or energy distribution information) may be manipulated to determine an approximate distance of a source of a potential problem relative to the location of a transmitting device (e.g., a user terminal transmitting to a TS on an upstream channel). This enhanced resolution in terms of localizing the problem source may serve to decrease debugging time and minimize downtime. Localizing the problem source based on the coefficients will be described below in conjunction with FIGS. 5A and 5B.

Figure 4:
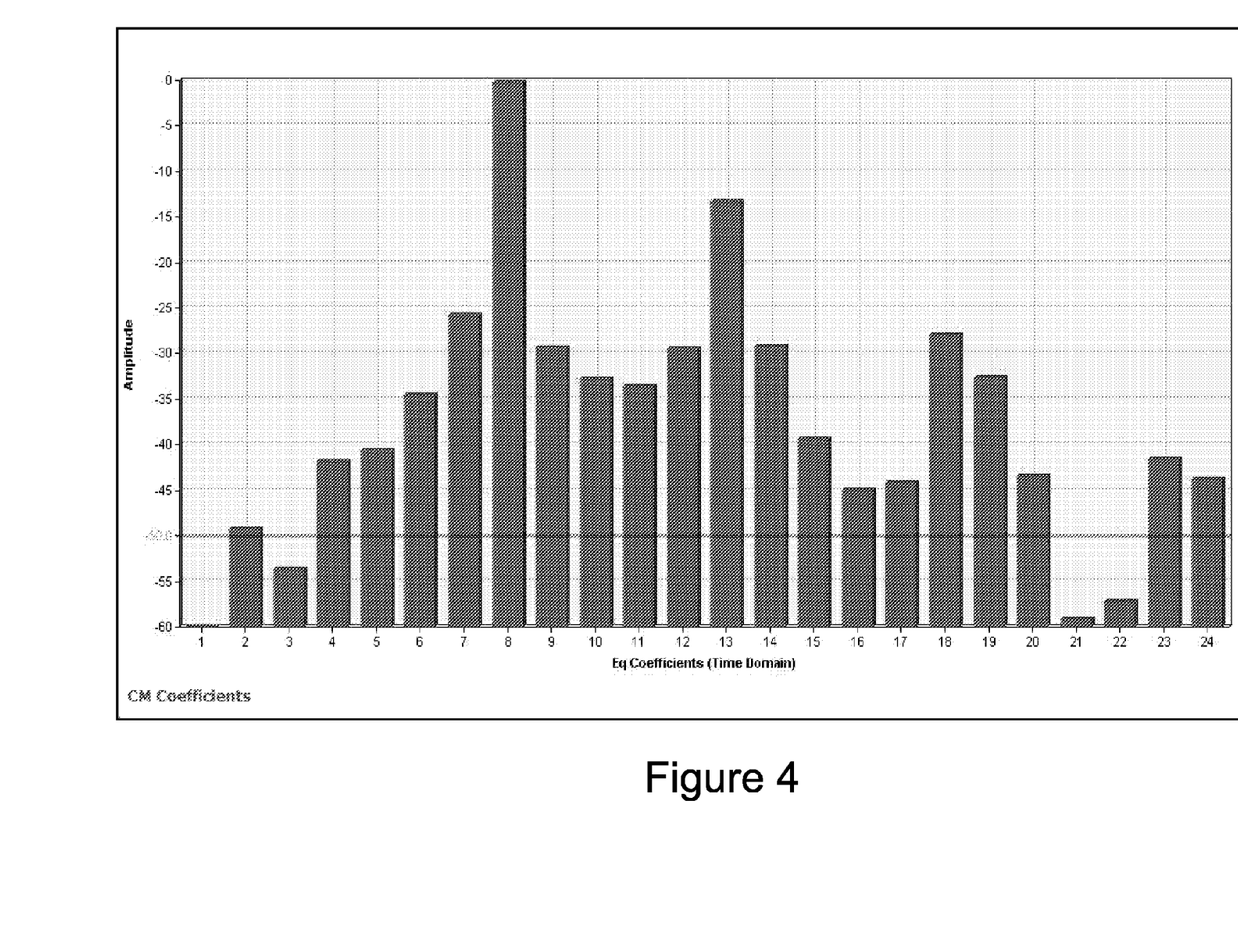
FIGS. 4 and 5A-5B illustrate tap bar graphs suitable for demonstrating one or more aspects of this disclosure.
Figure 5A:
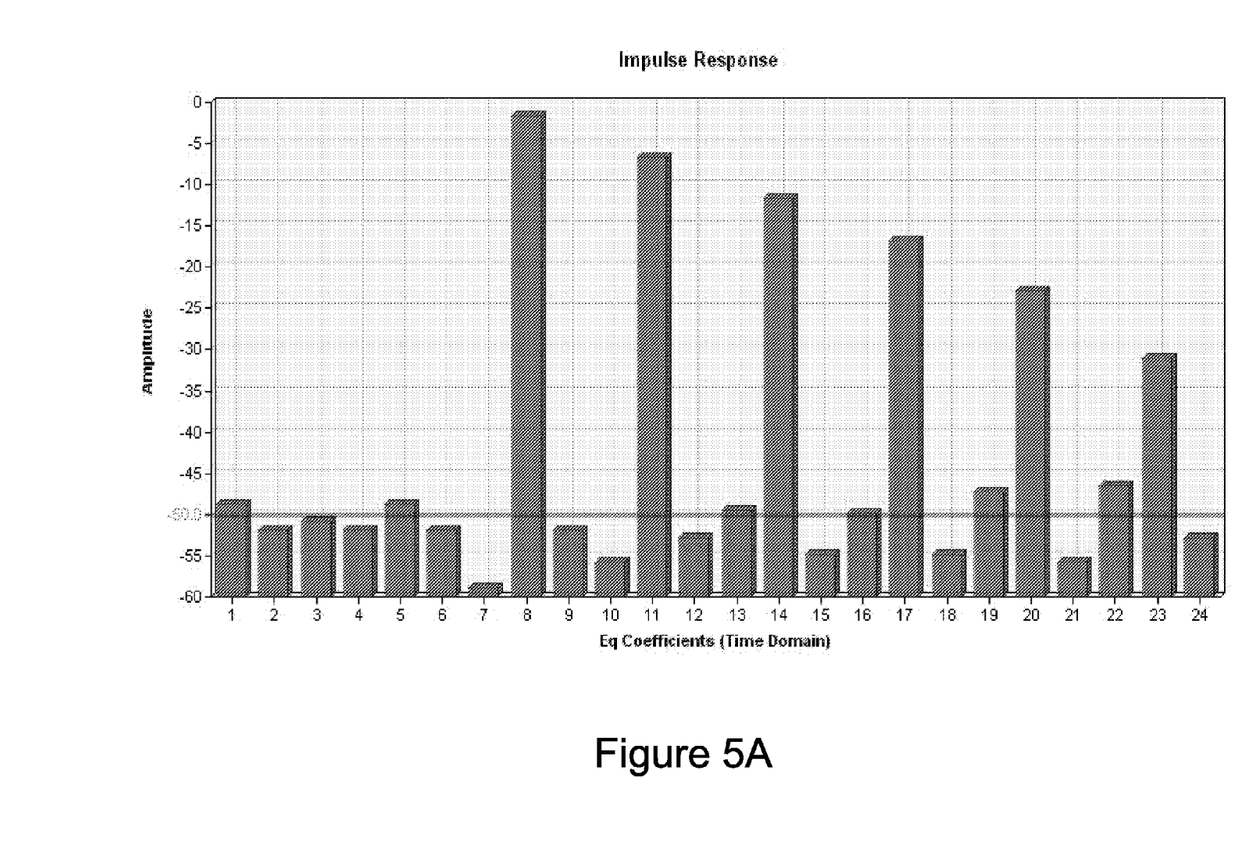
Figure 5B:
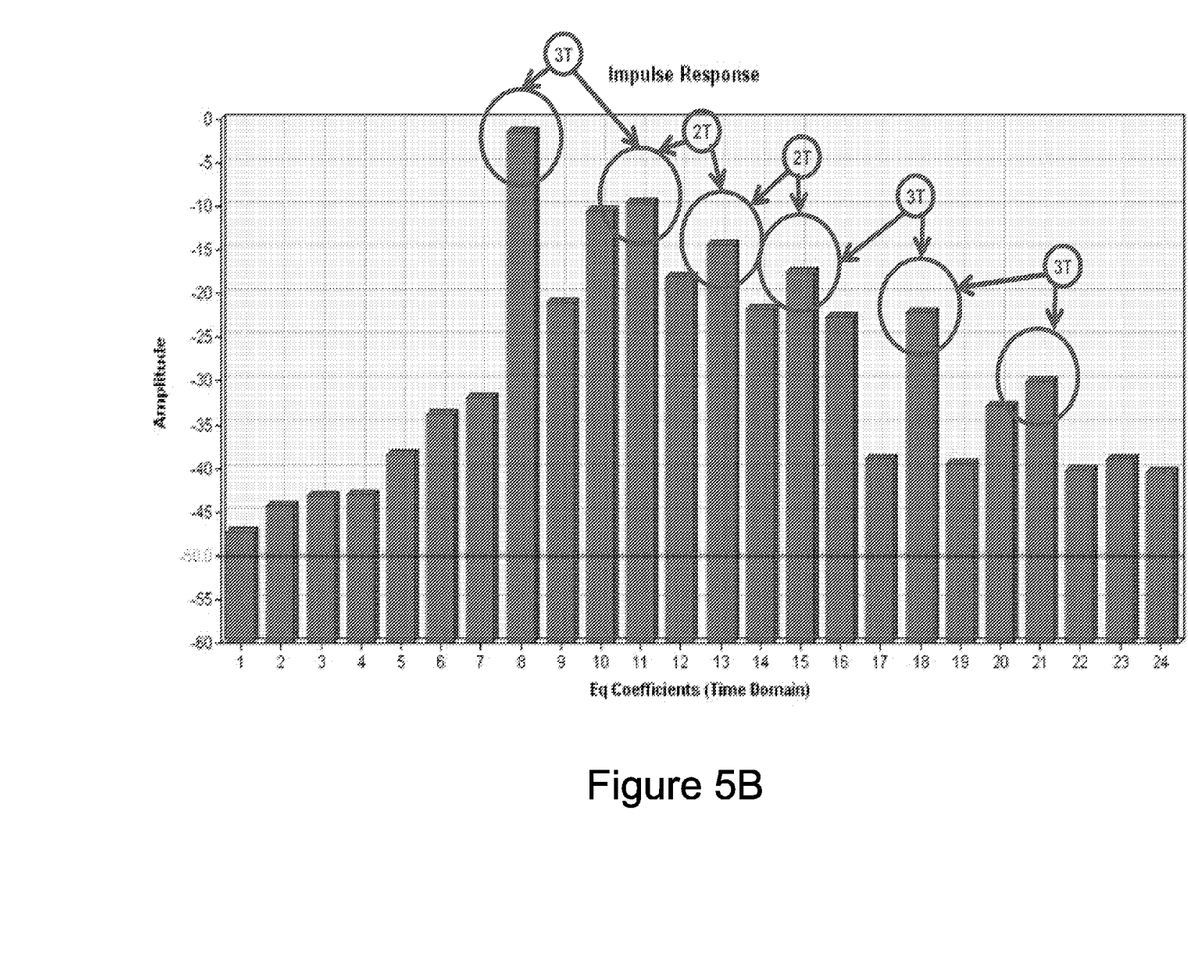

FIGS. 5A-5B illustrate bar graphs similar to the one shown in FIG. 4. In FIG. 5A, there are large energy peaks repeated every three sampling periods starting with tap 8 and progressing to the right (e.g., the bars associated with taps 8, 11, 14, 17, 20, and 23 are large relative to the bars associated with taps 9, 10, 12, 13, 15, 16, 18, 19, 21, 22, and 24). Assuming a symbol sampling frequency of 5.12 Mega symbols per second (Msps) (and a corresponding sampling period of 195 ns), the time period between errors is equal to 3×195 ns=585 ns.

The time period between errors may be manipulated to determine a distance between errors using velocity of propagation mathematics. Electromagnetic waves travel in free space at a known rate of 983,571,056 feet per second (ft/sec). For example, assuming that the communication channel that was responsible for generating the bar graph of FIG. 5A is a coaxial cable in an HFC system characterized by a velocity of propagation (VoP) equal to 87% of the velocity of propagation associated with free space, then the velocity of propagation in the coaxial cable would be equal to 0.87×983,571,056 ft/sec=855,706,819 ft/sec. Thus, given this velocity of propagation in the coaxial cable, and the fact that velocity is equivalent to distance divided by time, multiplying the velocity with the time between errors yields the distance between errors: 855,706,819 ft/sec*585 ns=500 ft. Given that the source of the error caused the (error) signal to traverse the coaxial cable twice (once as a result of the signal being transmitted from the transmitter of the user terminal to the location of the error source, and a second time as a result of an echo or reflection back from the error source to the transmitter), dividing the calculated distance by two yields: 500 ft/2=250 ft. This type of analysis is applicable to other communication media.

Thus, one could conclude that the source of the error is located approximately 250 ft from the user terminal in this example. Given that most user locations (e.g., homes 102 of FIGS. 1 and 2) include somewhere between 150 ft and 175 ft of signal transmission lines, in this illustrative scenario it is likely that the source of the error is located outside of the user's premises.

The example discussed above in connection with FIG. 5A (and more specifically, the numerical values used) is merely illustrative. The values used in the calculations may be modified in some embodiments, and different bar graphs or equalization coefficients may be obtained in various embodiments. For example, the approximate index of refraction for a single mode optical fiber at 1310 nm is 1.46, making its velocity of propagation 68% that of free space. Assuming that the bar graph of FIG. 5A was generated for a fiber optic implementation, the calculations described above in connection with the coaxial cable could be repeated for the optical fiber, replacing the 87% velocity of propagation factor characteristic of the coaxial cable with the 68% velocity of propagation factor characteristic of the optical fiber. A different value for the error distance would be arrived at, given the different velocity characteristics between the two transmission media. In those embodiments where more than one type of transmission media is used (e.g., a hybrid fiber-coax implementation), the calculations may encompass one or more of the velocity of propagation parameters.

FIG. 5A represents a simplified (and what is likely to be a rare) scenario where the majority of the energy of the taps is distributed at a multiple of the (195 ns) sampling period. FIG. 5B illustrates another (and perhaps more common) scenario, where the energy is distributed more uniformly across the taps in the presence of an error condition. The circles shown in FIG. 5B represent the tap spacing or T-spacing between (approximate) successive energy peaks. Averaging the spacing between peaks yields: 3T+2T+2T+3T+3T/5=2.6T. Accordingly, the techniques described above in connection with the scenario in FIG. 5A (where the error source was located at a distance corresponding to a multiple of the sampling period) can be generalized such that the location of the error source can be determined anywhere in the communication channel. As demonstrated in FIG. 5B, the tap energy represents a single echo however the first incident energy is distributed between taps 10 and 11 with a bias towards tap 11. In the case of a single echo, the subsequent peaks tap spans are averaged to obtain a finer granularity (resolution corresponding to values less than T). For example, when modeling using 2T-3T at 0.1T intervals, the averaging narrows the approximation to 0.25T accuracy.

To this point, the discussion in relation to FIGS. 5A and 5B has been based on determining the location of a single error. Of course, in some instances the communication channel may be subjected to multiple errors or error sources. In general, multiple errors may cause waveforms to add constructively, destructively, or cancel one another out completely (thus appearing as if no error is present). A few general points can be made regarding the presence of multiple errors. An analysis of multiple user terminals demonstrating a similar or common error/failure condition is likely indicative of a plant error as opposed to an error inside a user's premises. Reflections in the plant generally tend to be lower in size. Maintenance of accurate plant mappings can help to isolate problems. In general, large distortions are typical of in-home or user location wiring issues which most of the time consist of a single pair of reflectors. Feedback from field studies suggests that user location wiring issues are the source of approximately 85% of the issues/errors encountered, although any given typology or environment may be associated with any number of issues/errors at any given location.

Figure 6:
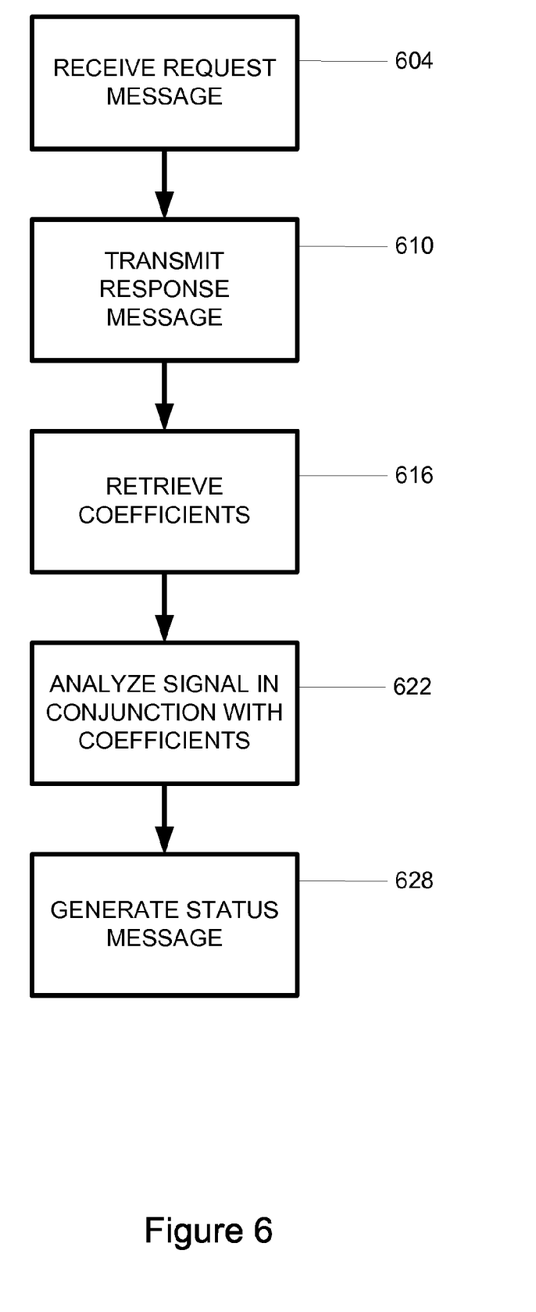
FIG. 6 illustrates a method suitable for practicing one or more aspects of this disclosure.

FIG. 6 illustrates a method that may be used in connection with one or more aspects of this disclosure. The method illustrated in FIG. 6 is from the perspective of a receiving device, such as a termination system (TS). The steps may be modified so as to be viewed from the perspective of a user terminal or any other device. One or more steps of FIG. 6 may perform a variety of functions including transforming an article (e.g., equalization coefficients in conjunction with a received signal) into a different state or thing (e.g., a likely or approximate location of a source of a problem or error).

In step 604, the TS may receive a request message from the user terminal. The request message may include a preamble or other predefined data fields, and optionally, payload or application related data. The request message may be processed by the TS to determine the qualities of the signal associated with the request message. Based on the qualities of the signal, the TS may establish or generate a set of equalization coefficients to be used by the user terminal.

In step 610, the TS may transmit a response message to the user terminal. The response message may include the equalization coefficients that were established for use by the user terminal. The response message may also include a parameter or flag directing the user terminal how to interpret or use equalization coefficients included in the response message. For example, as described above, the parameter may indicate whether the user terminal should replace the set of equalization coefficients currently used by the user terminal with the coefficients included in the response message, or whether the user terminal should combine (e.g., convolve) the set of equalization coefficients currently used by the user terminal with the coefficients included in the response message. The response message may include any other data needed by the user terminal to facilitate communication with the TS or another device.

As discussed above, the user terminal and TS may engage in a series or sequence of request-response message communications to obtain a stable or average set of values for the equalization coefficients. In this respect, steps 604 and 610 may repeat a number of times (e.g., as part of a looping operation) in some embodiments (not shown in FIG. 6).

In step 616, the equalization coefficients used by the user terminal may be retrieved. For example, the TS may poll the user terminal in order to obtain perspective on the state (e.g., the frequency response) of the communications between the TS and the user terminal. Alternatively, in some embodiments, the TS may store a copy of the equalization coefficients used by the user terminal and step 616 may include the TS retrieving those coefficients from memory associated with the TS. Periodically retrieving the coefficients and conducting an analysis as described below may facilitate proactive network management by uncovering potential problems before they manifest themselves as failures at the user terminal. Retrieving and conducting an analysis in the manner described may also be used as a reactive measure in response to a reported failure.

In some embodiments, retrieving the coefficients may entail obtaining the coefficients from both of the user terminal and the TS (e.g., from a memory associated with the TS). Using this latter technique, the coefficients obtained from the user terminal can be compared with the coefficients stored in the memory associated with the TS to determine whether the coefficients match. If the coefficients do not match (within a threshold), such a condition may be indicative of a hardware or software failure at one or both of the user terminal and the TS. A comparison could also be made between the TS and one or more other user terminals to try and isolate the problem (e.g., to determine whether the coefficient mismatch is likely due to a failing TS or whether the coefficient mismatch is unique to a particular user terminal). In some embodiments, one or more additional devices (e.g., a handheld mobile station) may be used to retrieve coefficients from the TS and/or user terminal in order to take the communication channel between the TS and the user terminal out of the equation.

In some embodiments, the convolution process may occur in two places/times—(1) during station maintenance and (2) during burst-receive. A TS may be configured to perform station maintenance using low-order QAM (QPSK) regardless of the modulation profile (64QAM, etc). Having a preamble using a robust modulation allows equalization to convolve around problems that might otherwise be too extreme and break the high-order QAM conversation. In a production plant, equalization not only works but it works so well that without it many (e.g., 64QAM) channels would have poor performance (if the channels would be operative at all).

In step 622, the signal received from the user terminal may be analyzed by the TS in conjunction with the coefficients retrieved via step 616. The analysis may include generating a displayable tap bar graph similar to the ones shown in FIGS. 4 and 5A-5B. The analysis may also include determining an approximate location of a problem or error source. For example, as discussed above, velocity of propagation mathematics may be used to determine the likely location of a source of a problem or error.

In step 628, a status message may be generated by the TS based on the analysis conducted in step 622. The status message may indicate the distance from the user terminal (or TS) to the source of the problem. The status message may include additional information that may be used to facilitate debugging or troubleshooting. For example, the TS may maintain a library or database of past issues or problems (with possible input from service personnel or the like) and the causes of those past problems. In this manner, the library or database may be consulted to identify not only the likely location of the problem or error, but the likely cause of the problem or error. Having such knowledge in advance of going to the site of the problem may enable service personnel to pack appropriate tool sets and may facilitate the selection of service personnel (e.g., if correcting the problem entails a specific skill set, one service technician could be selected over another).

The status message generated in step 628 may be conveyed in one or more formats. For example, the status message may include an audio message (e.g., a broadcast over radio), an email, a text message, an image/video message, or the like. If the problem is located in the user's premises (e.g., the user's home), the status message may be conveyed to the user and may either ask the user to schedule an appointment with service personnel, or if the problem is simple enough to correct (e.g., a loose connector), may provide the user with guidance (e.g., an instructional video) on how to fix the problem.

The method described above with respect to FIG. 6 is illustrative. In some embodiments, some of the steps may be optional, additional steps not shown may be included, and the steps may be rearranged or reordered. For example, in some embodiments coefficients may be obtained from multiple user terminals for purposes of isolating problems (or determining the likelihood of where a problem exists).

While the above description was presented largely in the context of user terminals in communication with a TS, aspects of this disclosure may readily be applied to other contexts as well. For example, the qualities of peer to peer communication systems, (mobile) telephone communication systems, satellite communication systems, and the like may also be monitored and evaluated using the techniques described herein. Of course, the contexts described herein are merely illustrative. Additional contexts are well within the scope and spirit of this disclosure.

Although not required, various aspects described herein may be embodied as a method, a data processing system, or as a computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. In addition, various signals representing data or events as described herein may be transferred between a source and a destination in the form of electromagnetic waves traveling through signal-conducting media such as metal wires, optical fibers, and/or wireless transmission media (e.g., air and/or space). In some embodiments, one or more transitory and/or non-transitory media may include instructions that, when executed by one or more computers or apparatuses, cause the one or more computers or apparatuses to perform the methodological acts and processes described herein.

As described herein, the various methods and acts may be operative across one or more computing servers and one or more networks. The functionality may be distributed in any manner, or may be located in a single computing device (e.g., a service provider's server, a client computer/user terminal, etc.). As discussed herein, timing and frequency information related to communications between two or more devices may be obtained across various television, telephone, and computer networks, and both proactive and reactive support in the presence of potential problems or actual errors is provided for.

As described herein, the methodological acts and processes may be tied to particular machines or apparatuses. For example, as described herein, a user terminal, such as a cable modem, may equalize a signal prior to transmitting the signal to a receiving device (e.g., a TS). The receiving device may analyze the received signal in connection with the equalization coefficients to determine a likely location of a problem or error. More generally, one or more computers may include one or more processors and memory storing instructions, that when executed, perform the methodological acts and processes described herein. Furthermore, the methodological acts and processes described herein may perform a variety of functions including transforming an article (e.g., equalization coefficients in conjunction with a received signal) into a different state or thing (e.g., a likely or approximate location of a source of a problem or error).

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein.

What is claimed is:

1. A method comprising:
   transmitting, by a computing device and to a user terminal, a first set of equalization coefficients and a parameter indicating that the user terminal is to replace a second set of equalization coefficients with the first set of equalization coefficients;
   receiving, by the computing device and from the user terminal, a communication having distortion compensation based, at least in part, on the first set of equalization coefficients;
   determining, by the computing device, a third set of equalization coefficients associated with the communication;
   determining, by the computing device, a location of an error source relative to a location of the user terminal based, at least in part, on the third set of equalization coefficients; and
   in response to determining that the first set of equalization coefficients does not match the third set of equalization coefficients within a threshold amount, determining that the error occurred at one or more of the computing device or the user terminal.

2. The method of claim 1, wherein the third set of equalization coefficients comprises at least one of post-equalization coefficients of the user terminal and pre-equalization coefficients of the user terminal.

3. The method of claim 1, further comprising:
   receiving a message from the user terminal, the message comprising a predefined data field;
   determining a frequency response associated with a communication channel associated with the user terminal based on the predefined data field; and
   assigning values to the first set of equalization coefficients based on the frequency response.

4. The method of claim 3, wherein the values assigned to the first set of equalization coefficients correspond to an inverse of the frequency response.

5. The method of claim 1, further comprising:
   measuring one or more values of time between peak equalization coefficient values in the third set of equalization coefficients; and
   using the one or more values of time between the peak equalization coefficient values to determine the location of the error source relative to the location of the user terminal.

6. The method of claim 5, further comprising:
   calculating an average value of time from the one or more values of time between the peak equalization coefficient values, wherein the determining the location of the error source is based on the average value of time.

7. The method of claim 1, wherein the determining the location of the error source is further based on a velocity of propagation associated with a communication channel associated with the user terminal.

8. The method of claim 1, further comprising:
   generating a status message indicating the location of the error source.

9. The method of claim 8, wherein the status message comprises at least one of an audio message, an email, a text message, an image, and a video.

10. The method of claim 1, further comprising:
determining a probable cause of an error at the error source based on values of the third set of equalization coefficients.

11. An apparatus comprising:
at least one processor; and
memory storing instructions that, when executed by the at least one processor, cause the apparatus to:
transmit, to a user terminal, a first set of equalization coefficients and a parameter indicating that the user terminal is to replace a second set of equalization coefficients with the first set of equalization coefficients;
receive, from the user terminal, a communication having distortion compensation based, at least in part, on the first set of equalization coefficients;
determine a third set of equalization coefficients associated with the communication;
determine a location of an error source relative to a location of the user terminal based, at least in part, on the third set of equalization coefficients; and
in response to determining that the first set of equalization coefficients does not match the third set of equalization coefficients within a threshold amount, determine that the error occurred at one or more of the apparatus or the user terminal.

12. The apparatus of claim 11, wherein the third set of equalization coefficients comprises at least one of post-equalization coefficients of the user terminal and pre-equalization coefficients of the user terminal.

13. The apparatus of claim 11, wherein the instructions, when executed by the at least one processor, cause the apparatus to:
measure one or more values of time between peak equalization coefficient values in the third set of equalization coefficients; and
use the one or more values of time between the peak equalization coefficient values to determine the location of the error source relative to the location of the user terminal.

14. The apparatus of claim 13, wherein the instructions, when executed by the at least one processor, cause the apparatus to:
calculate an average value of time from the one or more values of time between the peak equalization coefficient values; and
determine the location of the error source based on the average value of time.

15. The apparatus of claim 11, wherein the instructions, when executed by the at least one processor, cause the apparatus to:
determine the location of the error source further based on a velocity of propagation associated with a communication channel associated with the user terminal.

16. One or more non-transitory computer-readable media storing executable instructions that, when executed by at least one computer, cause the at least one computer to:
transmit, to a user terminal, a first set of equalization coefficients and a parameter indicating that the user terminal is to replace a second set of equalization coefficients with the first set of equalization coefficients;
receive, from the user terminal, a communication having distortion compensation based, at least in part, on the first set of equalization coefficients;
determine a third set of equalization coefficients associated with the communication;
determine a location of an error source relative to a location of the user terminal based, at least in part, on the third set of equalization coefficients; and
in response to determining that the first set of equalization coefficients does not match the third set of equalization coefficients within a threshold amount, determine that the error occurred at one or more of the at least one computer or the user terminal.

17. The one or more non-transitory computer-readable media of claim 16, wherein the executable instructions, when executed by the at least one computer, further cause the at least one computer to:
measure one or more values of time between peak equalization coefficient values in the third set of equalization coefficients; and
determine the location of the error source relative to the location of the user terminal based on the one or more values of time between the peak equalization coefficient values.

18. The one or more non-transitory computer-readable media of claim 16, wherein the executable instructions, when executed by the at least one computer, further cause the at least one computer to:
determine the location of the error source further based on a velocity of propagation associated with a communication channel associated with the user terminal.

* * * * *

UNITED STATES PATENT AND TRADEMARK OFFICE
CERTIFICATE OF CORRECTION

PATENT NO. : 9,479,515 B2
APPLICATION NO. : 13/782573
DATED : October 25, 2016
INVENTOR(S) : Lawrence D. Wolcott et al.

It is certified that error appears in the above-identified patent and that said Letters Patent is hereby corrected as shown below:

On the Title Page

Column 2 of Other Publications, Line 2:
Please delete "Preequalization" and insert --Pre-Equalization--

Page 2, Column 2 of Other Publications, Line 4:
Delete "3010." and insert --2010.--

Page 2, Column 2 of Other Publications, Line 9:
Delete "micro-reftection" and insert --micro-reflection--

In the Specification

Column 10, Detailed Description, Line 25:
Delete "(64QAM," and insert --(64-QAM,--

Column 10, Detailed Description, Line 30:
Delete "64QAM)" and insert --64-QAM)--

Signed and Sealed this
Twenty-seventh Day of December, 2022

Katherine Kelly Vidal
*Director of the United States Patent and Trademark Office*